United States Patent [19]

Roberts et al.

[11] 3,781,840
[45] Dec. 25, 1973

[54] INSTRUMENT FOR GUIDING THE BLIND IN FILLING OPEN-TOP VESSELS

[75] Inventors: Richard W. Roberts, Schenectady; George Jernakoff, Loudonville, both of N.Y.

[73] Assignee: General Electric Company, Schenectady, N.Y.

[22] Filed: June 2, 1972

[21] Appl. No.: 259,158

[52] U.S. Cl. .............................. 340/245, 340/244 C
[51] Int. Cl. .......................................... G08b 21/00
[58] Field of Search.................. 340/244, 372, 373, 340/376, 381, 245; 137/392; 73/374; 116/109

[56] References Cited
UNITED STATES PATENTS 3,704,724  12/1972  Holbrook et al................... 137/392
3,636,556  1/1972  Pihl................................... 340/373

Primary Examiner—Donald J. Yusko
Assistant Examiner—Daniel Myer
Attorney—John F. Ahern et al.

[57] ABSTRACT

Arrival of liquid at the fill level of a drinking vessel or other open-top domestic container is signaled by audio or tactile means of an instrument including a battery and an amplifying switch in an instrument housing and a pair of electrodes which extend through the housing and serve additionally as hanger means for supporting the instrument in operating position on the vessel with the free lower ends of the electrodes exposed to contact liquid at the fill level so that the switch is actuated and a signal is generated when the filling operation is to be terminated.

1 Claim, 7 Drawing Figures

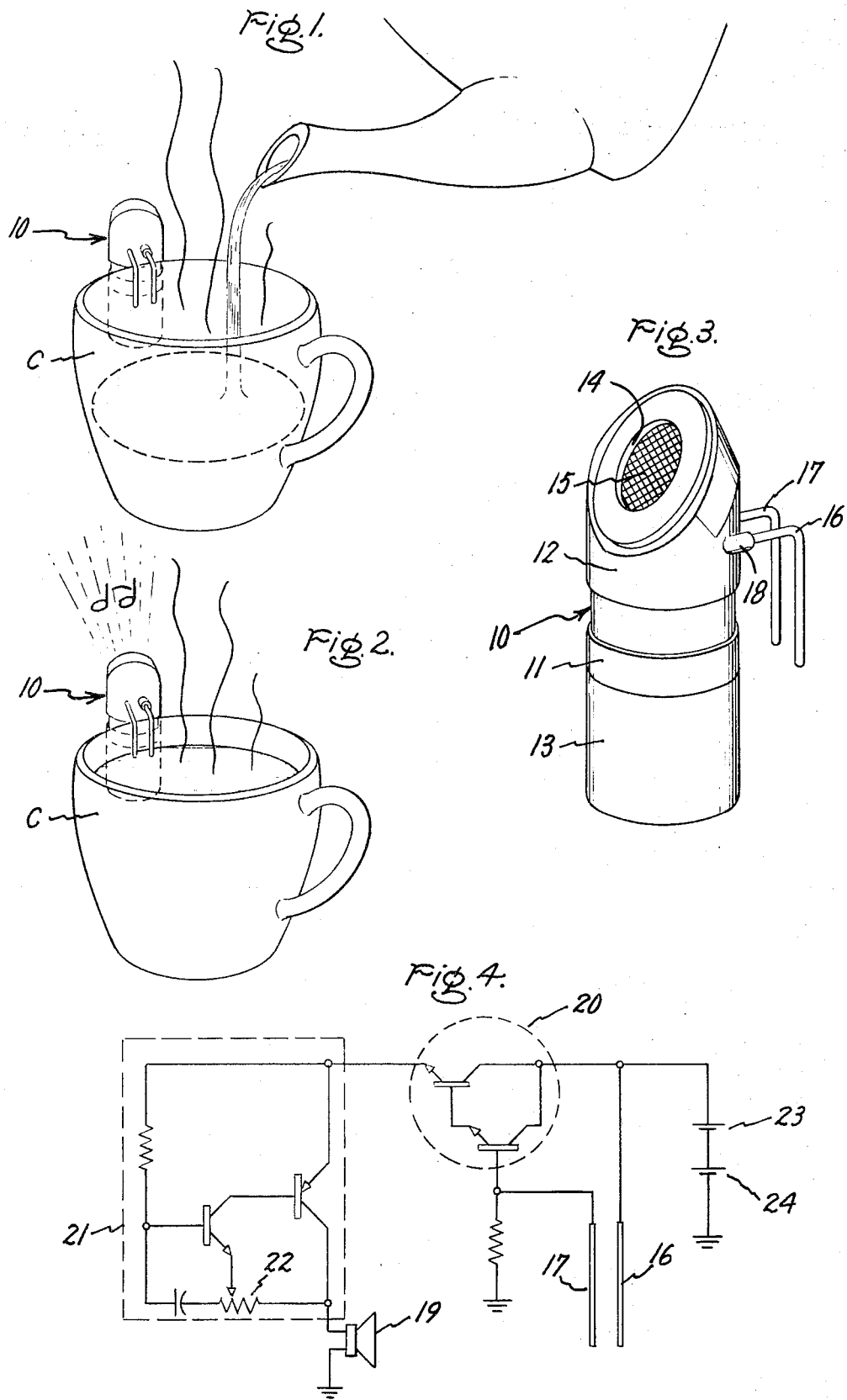

INSTRUMENT FOR GUIDING THE BLIND IN FILLING OPEN-TOP VESSELS

The present invention relates generally to sensing instruments and is more particularly concerned with a new device to guide the blind in filling drinking vessels and similar open-top domestic containers with liquids.

A blind person must have ways to compensate for that sensory loss if he is to function independently. While he can develop some of these ways through his other senses, assistance provided by an external source is necessary for such a simple routine task as filling a coffee cup. Overfilling spills are frequent occurrences even for the most experienced individuals, and hazard is added to nuisance when the liquid is toxic, corrosive or very hot. Thus, there has long been a need for a practicable method or means which would enable the blind to pour liquids as surely and easily as if they had sight.

This need has been met and satisfied for the first time to our knowledge by the present invention which takes the form of an instrument which instantly and automatically indicates by an audio or tactile signal when liquid in a cup or glass reaches the full level. This instrument is self-contained and also small, light and easy for a blind person to use, being adapted to be hung in operating position on the lip of an open-top vessel and being readily transferrable from one vessel to another.

Briefly described, the instrument of this invention comprises in combination a suitable shell or housing which conveniently is half-pen size or at least smoewhat smaller than vessels with which the instrument is to be used, hanger means for temporarily supporting the housing on a vessel to be filled, a battery in the housing, suitable audio or tactile means in the housing, an amplifying switch operatively connected to the signaling means, and a primary electrode and a counter electrode for coupling the switch to the power source through liquid reaching the fill level in the vessel. The electrodes serve dual purposes in that they perform both electrical and mechanical functions in this combination. Thus, each electrode extends through the housing to engage the vessel wall and has a downwardly direction portion terminating in free lower end spaced from the housing for contact with liquid in the vessel at a predetermined fill level. Consequently, in operating attitude the instrument housing is disposed outside the vessel with the lower free ends of the electrodes in the vessel at the fill level.

In the drawings accompanying and forming a part of this specification:

FIG. 1 is a perspective view of an instrument of this invention in use with a drinking cup into which liquid is being poured;

FIG. 2 is a view similar to that of FIG. 1, showing the liquid at the fill level contacting the free ends of the instrument electrodes and causing the instrument to generate a sonic signal;

FIG. 3 is an enlarged view in perspective of the FIG. 1 instrument;

FIG. 4 is a wiring diagram of the FIG. 1 instrument;

Figure 5:
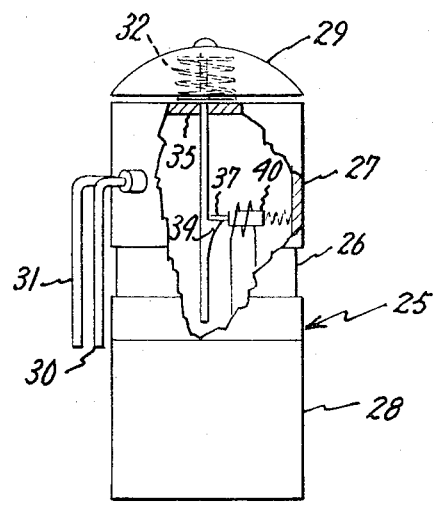
FIG. 5 is a view in elevation of another instrument of this invention incorporating tactile indicating means, parts being broken away for clarity.

As shown in the drawings, instrument 10 is contained in a lightweight, generally cylindrical shell or housing 11 comprising an upper aluminum portion 12 in threaded engagement with a lower plastic portion 13. An opening 14 is provided in the top of the housing and a fine-mesh screen 15 covering opening 14 and secured within the housing protects operating components of the instrument.

A primary electrode 16 and a counter electrode 17 extend through an upper portion 12 of the housing and are disposed as spaced, parallel, rigid, wire-like hangers to fit over the lip of a drinking cup C as shown in FIGS. 1 and 2. The free lower ends of the electrodes thus are disposed at the level in the cup to which liquid is to be brought in filling it. A bushing 18 of suitable plastic material such as polyethylene electrically insulates primary electrode 16 from the metal of the instrument housing.

As shown in FIG. 4, a small earphone loudspeaker 19 for producing an acoustic signal is connected to the output of oscillator circuit 21. Oscillator circuit 21 is illustrated as comprising an RC transistor oscillator as is known in the art. Any suitable oscillator may be utilized. Further, oscillator 21 may conveniently include an audio tone adjusting means, such as potentiometer 22. A typical frequency would be 2.5 KHz.

Oscillator 21 is connected to cells 23 and 24 through amplifying switch 20, which, when activated, turns on oscillator 21. Electrodes 16 and 17 connect the control electrode of switch 20 to 1.3-volt mercury primary cells 23 and 24. When the electrodes are immersed in liquid, only approximately $2 \times 10^{-6}$ amperes need be drawn to actuate switch 20. This sensitivity is more than adequate to cause an alarm with typical water conductivity and the strength of the alarm signal will vary depending upon the conductivity of the liquid contacting the electrodes. In fact, this device is sensitive enough that it can be used to test alcoholic drinks, signal strength being inversely proportional to alcoholic content because of the comparatively limited conductivity of ethyl alcohol.

Figure 6:
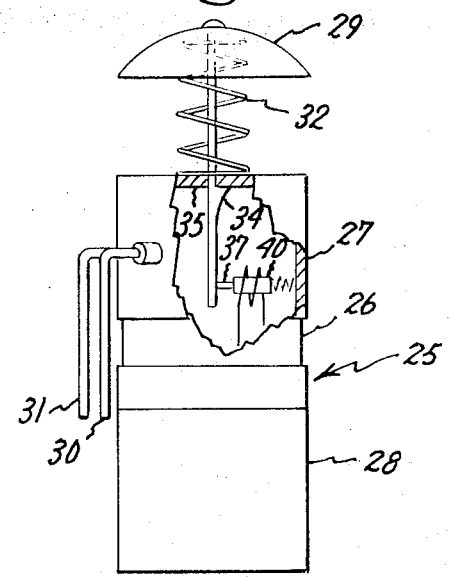
FIG. 6 is a view like that of FIG. 5 showing the instrument tactile means in actuated attitude.
Figure 7:
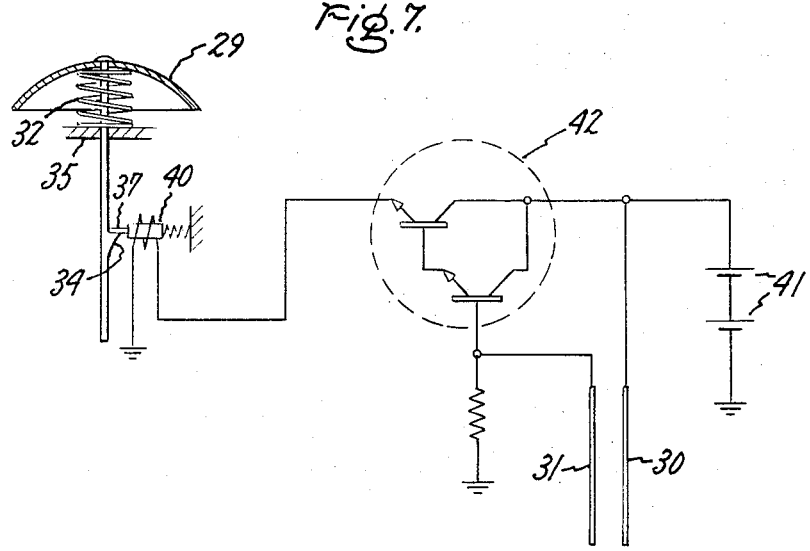
FIG. 7 is a wiring diagram of the circuit of the FIG. 5 instrument.

Instrument 25 illustrated in FIGS. 5-7 is similar to instrument 10 in that it is contained in a lightweight, cylindrical shell or housing 26 comprising an upper aluminum portion 27 in threaded engagement with a lower rigid plastic portion 28. An opening is provided in the top of the housing to receive the stem of manual reset pin 29.

A primary electrode 30 and a counter electrode 31 extend through housing upper portion 27 as a pair of spaced, wire-like hangers to rest on the lip of a drinking vessel, as described in reference to FIGS. 1 and 2. Also, as in the FIG. 1 device, the ends of the electrodes outside the housing are situated so that liquid reaching the fill level of the vessel will contact them, closing an electric circuit and actuating the instrument, as will be described below. Electrode 30 is electrically insulated from housing 26 by a sleeve of plastic material, suitably polyethylene.

The signal generated by instrument 25 is in general terms a tactile one, which makes this device particularly suitable for use by a blind individual who also has hearing impairment. Coil spring 32 disposed around the stem of pin 29 and bearing against the top of housing 26 and the under surface of the enlarged head portion of the reset pin resiliently urges the pin upwardly toward a "stop" position. The lower end of the pin stem has a lug portion 34 for engagement with a stationary stop 35 and for engagement with trigger lever 37 which is spring biased toward pin 29. A solenoid 40 is coupled to lever 37 to release pin 29 when the solenoid is connected to a power source 41 through amplifying switch 42, as shown in FIG. 7. Electrodes 30 and 31 thus serve to actuate the solenoid when the gap between them is electrically bridged by a body of liquid having requisite conductivity. In the illustrated embodiment, power source 41 consists of two 1.3-volt mercury primary cells disposed in lower portion 28 of the instrument housing.

In typical use the FIG. 5 device is "cocked" by pressing reset pin 29 down into latching engagement with trigger level 37. Then the device is hung on a vessel to be filled as illustrated in FIG. 1 and pouring of liquid is begun while the user's finger rests on the top of pin 29. Release of pin 29 is consequently felt by the user the instant that the liquid level in the vessel reaches the ends of electrodes 30 and 31 at the fill level in the vessel.

Instruments of this invention in which the alarm element takes the form of a vibrator for tactile detection will preferably include a multivibrator of frequency in the 10 to 20 Hz range.

What we claim as new and desire to secure by Letters Patent of the United States is:

1. A self-contained signal-generating instrument to guide a blind person in filling an open-top domestic container such as a drinking vessel with a liquid, which comprises in combination,
   a. a housing substantially smaller than vessels with which it is to be used;
   b. hanger means for temporarily supporting the housing on a vessel to be filled including a rigid wire-like primary electrode and a rigid wire-like counter electrode extending through an upper portion of the housing to engage a vessel lip with the housing hanging outside such vessel and the electrodes additionally having downwardly directed portions in such vessel terminating in free lower ends spaced from the housing for contact with liquid at a predetermined vessel fill level;
   c. an electrical power source in the housing;
   d. indicating means in the housing to produce a sensible signal;
   e. amplifying switch means electrically connected to the counter electrode and operatively connected to the indicating means; and,
   f. said primary electrode being connected to the power source whereby the amplifying switch is coupled to the power source and converted to its conducting state when liquid contacts the lower ends of the electrodes and electrically connects the counter electrode to the primary electrode and the power source.

* * * * *